(12) United States Patent
Cimo et al.

(10) Patent No.: US 11,078,102 B2
(45) Date of Patent: Aug. 3, 2021

(54) THIN GLASS SHEET AND SYSTEM AND METHOD FOR FORMING THE SAME

(71) Applicant: Corning Incorporated, Corning, NY (US)

(72) Inventors: Patrick Joseph Cimo, Corning, NY (US); Adam James Ellison, Corning, NY (US); Michael Thomas Gallagher, Painted Post, NY (US); Dennis James Post, Addison, NY (US); Butchi Reddy Vaddi, Painted Post, NY (US); Natesan Venkataraman, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 371 days.

(21) Appl. No.: 15/529,226

(22) PCT Filed: Nov. 20, 2015

(86) PCT No.: PCT/US2015/061724
§ 371 (c)(1),
(2) Date: May 24, 2017

(87) PCT Pub. No.: WO2016/085778
PCT Pub. Date: Jun. 2, 2016

(65) Prior Publication Data
US 2018/0327296 A1    Nov. 15, 2018

Related U.S. Application Data

(60) Provisional application No. 62/084,826, filed on Nov. 26, 2014.

(51) Int. Cl.
*C03B 17/02* (2006.01)
*C03B 17/06* (2006.01)
(Continued)

(52) U.S. Cl.
CPC .............. *C03B 17/02* (2013.01); *B32B 17/06* (2013.01); *C03B 17/064* (2013.01);
(Continued)

(58) Field of Classification Search
CPC .... C03B 17/02; C03B 23/0006; C03B 23/037
See application file for complete search history.

(56) References Cited

U.S. PATENT DOCUMENTS 3,582,305 A * 6/1971 Dunlap et al. ........ C03B 23/037
65/106
3,635,687 A * 1/1972 Dunlap ................. C03B 17/065
65/106
(Continued)

FOREIGN PATENT DOCUMENTS

CH        710312 A2 * 4/2016 ........... C03B 23/047
DE   102014100750 A1 * 10/2014 ........... C03B 23/037
(Continued)

OTHER PUBLICATIONS

English Translation of CN201580074482.8 First Office Action dated Apr. 9, 2019, China Patent Office, 14 Pgs.
(Continued)

*Primary Examiner* — Jason L Lazorcik

(57) ABSTRACT

A method includes heating a glass preform having a plurality of glass layers and drawing the glass preform in a distal direction to form a drawn glass sheet extending distally from the glass preform and having the plurality of glass layers. The drawn glass sheet is thinner than the glass preform. The drawn glass sheet can be rolled onto a collection spool. At least a portion of a glass layer can be removed from the drawn glass sheet. An exemplary glass sheet includes a first glass layer, a second glass layer adjacent to the first glass layer, and a thickness of at most about 0.1 mm. An exemplary ion exchanged glass sheet includes a thickness of at most about 0.1 mm and a surface layer that is under a
(Continued)

compressive stress and extends into an interior of the glass sheet to a depth of layer.

16 Claims, 5 Drawing Sheets

(51) Int. Cl.
| | |
|---|---|
| *C03B 23/037* | (2006.01) |
| *C03B 33/02* | (2006.01) |
| *C03B 29/16* | (2006.01) |
| *C03C 21/00* | (2006.01) |
| *C03C 3/091* | (2006.01) |
| *C03C 3/087* | (2006.01) |
| *C03C 3/093* | (2006.01) |
| *C03C 3/097* | (2006.01) |
| *B32B 17/06* | (2006.01) |

(52) U.S. Cl.
CPC ............ *C03B 23/037* (2013.01); *C03B 29/16* (2013.01); *C03B 33/0207* (2013.01); *C03B 33/0215* (2013.01); *C03C 3/087* (2013.01); *C03C 3/091* (2013.01); *C03C 3/093* (2013.01); *C03C 3/097* (2013.01); *C03C 21/00* (2013.01); *B32B 2307/30* (2013.01); *B32B 2457/14* (2013.01); *B32B 2509/00* (2013.01); *B32B 2605/00* (2013.01); *B65H 2801/61* (2013.01); *C03C 2218/355* (2013.01)

(56) References Cited

U.S. PATENT DOCUMENTS

| | | | |
|---|---|---|---|
| 3,684,468 A * | 8/1972 | *Name ................. | C03B 37/025 65/437 |
| 3,746,526 A | 7/1973 | Giffon | |
| 3,879,182 A * | 4/1975 | Strack ................... | C03B 23/047 65/37 |
| 3,899,315 A * | 8/1975 | Siegmund .......... | B29D 11/0073 65/23 |
| 4,102,664 A * | 7/1978 | Dumbaugh, Jr. ......... | C03B 7/00 216/33 |
| 4,214,886 A * | 7/1980 | Shay ....................... | B32B 37/15 65/121 |
| 4,268,296 A * | 5/1981 | Pfaender ................ | C03B 17/06 373/35 |
| 4,303,436 A * | 12/1981 | Rossi ...................... | C03B 17/06 65/67 |
| 4,486,213 A * | 12/1984 | Lentz ..................... | C03B 17/02 156/294 |
| 5,342,426 A | 8/1994 | Dumbaugh, Jr. | |
| 5,840,096 A * | 11/1998 | Tajima .................. | C03B 23/037 75/334 |
| 5,886,820 A * | 3/1999 | Tajima .................. | C03B 23/037 359/487.06 |
| 6,393,868 B1 * | 5/2002 | Krauss .................. | C03B 23/037 65/23 |
| 7,201,965 B2 | 4/2007 | Gulati et al. | |
| 7,231,786 B2 | 6/2007 | Cimo et al. | |
| 7,514,149 B2 | 4/2009 | Bocko et al. | |
| 7,677,058 B2 | 3/2010 | Hawtof et al. | |
| 7,817,340 B2 * | 10/2010 | Borrelli ..................... | C03C 4/00 359/487.06 |
| 8,211,505 B2 | 7/2012 | Bocko et al. | |
| 8,359,884 B2 | 1/2013 | Hawtof | |
| 8,966,940 B2 * | 3/2015 | Kumada ............... | C03B 23/047 65/94 |
| 9,321,679 B2 | 4/2016 | Chang et al. | |
| 9,431,630 B2 | 8/2016 | Huang et al. | |
| 9,597,829 B2 * | 3/2017 | Banaei .................. | C03B 37/027 |
| 2004/0093900 A1 * | 5/2004 | Fredholm ............. | C03B 17/064 65/25.3 |
| 2004/0197575 A1 * | 10/2004 | Bocko ..................... | C03B 19/12 428/432 |
| 2005/0000599 A1 * | 1/2005 | Liebermann ........ | H01F 1/15333 148/300 |
| 2006/0021385 A1 | 2/2006 | Cimo et al. | |
| 2006/0127679 A1 * | 6/2006 | Gulati ..................... | B32B 17/06 428/426 |
| 2008/0085401 A1 * | 4/2008 | Garner ................ | H01L 51/0097 428/192 |
| 2009/0019892 A1 | 1/2009 | Fredholm et al. | |
| 2010/0087307 A1 | 4/2010 | Murata et al. | |
| 2010/0192634 A1 * | 8/2010 | Higuchi ............ | B29C 66/91933 65/60.1 |
| 2010/0281921 A1 * | 11/2010 | Bisson .................... | C03B 17/06 65/101 |
| 2011/0200804 A1 | 8/2011 | Tomamoto et al. | |
| 2011/0200805 A1 * | 8/2011 | Tomamoto ............ | C03B 23/203 428/213 |
| 2011/0240499 A1 | 10/2011 | Taniguchi et al. | |
| 2011/0318555 A1 * | 12/2011 | Bookbinder ............ | C03C 3/085 428/213 |
| 2012/0135187 A1 * | 5/2012 | Takimoto .................. | B32B 7/06 428/131 |
| 2012/0301683 A1 * | 11/2012 | Li ........................ | B65D 81/055 428/192 |
| 2014/0050911 A1 | 2/2014 | Mauro et al. | |
| 2014/0242329 A1 | 8/2014 | Banaei | |
| 2014/0242375 A1 * | 8/2014 | Mauro .................. | C03B 17/064 428/312.6 |
| 2015/0251944 A1 * | 9/2015 | Brackley ............... | C03B 33/033 83/23 |
| 2017/0225994 A1 * | 8/2017 | Buellesfeld .......... | C03B 23/037 |

FOREIGN PATENT DOCUMENTS

| | | | | |
|---|---|---|---|---|
| DE | 102013109443 A1 * | 3/2015 | .......... | C03B 23/037 |
| DE | 102014103431 A1 * | 9/2015 | .......... | C03B 17/068 |
| DE | 102016107934 A1 * | 11/2017 | .......... | C03C 3/087 |
| DE | 102016115297 A1 * | 2/2018 | .......... | C03B 17/068 |
| FR | 2788267 A1 * | 7/2000 | .......... | H01J 29/864 |
| JP | 58095622 A * | 6/1983 | .......... | C03B 23/037 |
| JP | 2012087006 A | 5/2012 | | |
| KR | 2014007252 A | 1/2014 | | |
| WO | 2008150355 A1 | 12/2008 | | |
| WO | WO-2011013555 A1 * | 2/2011 | .......... | C03B 33/037 |
| WO | WO-2012081503 A1 * | 6/2012 | .......... | C03B 23/037 |
| WO | WO-2013070672 A1 * | 5/2013 | .......... | C03B 23/037 |
| WO | 2014139147 A1 | 9/2014 | | |
| WO | WO-2016055524 A2 * | 4/2016 | .......... | C03B 23/207 |

OTHER PUBLICATIONS

Matthewson et al. "Strength Measurement of Optical Fibers by Bending." J Am Ceram Soc 69, 815-821. 1986.
International Search Report and Written Opinion PCT/US2015/061724 dated Apr. 18, 2016.

* cited by examiner

THIN GLASS SHEET AND SYSTEM AND METHOD FOR FORMING THE SAME

This application claims the benefit of priority to International Application No. PCT/US2015/061724, filed on Nov. 20, 2015, which claims the benefit of priority to U.S. Application No. 62/084826, filed on Nov. 26, 2014, the content of each of which is incorporated herein by reference in its entirety.

BACKGROUND

1. Field

This disclosure relates to glass sheets, and more particularly to thin glass sheets and systems and methods for forming the same.

2. Technical Background

A glass sheet can be formed using a variety of different processes. For example, a glass sheet can be formed using a down draw process (e.g., fusion draw or slot draw) or a float process. A thin glass sheet can be formed by etching or grinding a thicker glass sheet to reduce its thickness to the desired thickness.

SUMMARY

Disclosed herein are thin glass sheets and methods for forming the same.

Disclosed herein is a method comprising heating a glass preform comprising a plurality of glass layers. The glass preform is drawn in a distal direction to form a drawn glass sheet extending distally from the glass preform and comprising the plurality of glass layers. A thickness of the drawn glass sheet is less than a thickness of the glass preform. The drawn glass sheet is rolled onto a collection spool.

Disclosed herein is a method comprising heating a glass preform comprising a first glass layer and a second glass layer adjacent to the first glass layer. The glass preform is drawn in a distal direction to form a drawn glass sheet extending distally from the glass preform and comprising the first glass layer and the second glass layer. A thickness of the drawn glass sheet is less than a thickness of the glass preform. At least a portion of the second glass layer is removed from the drawn glass sheet.

Disclosed herein is a system comprising a heating unit, a drawing unit, and a collection unit. The heating unit is configured to heat a glass preform comprising a plurality of glass layers. The drawing unit is configured to draw the glass preform in a distal direction to form a drawn glass sheet extending distally from the glass preform. The drawn glass sheet comprises the plurality of glass layers. A thickness of the drawn glass sheet is less than a thickness of the glass preform. The collection unit is configured to roll the drawn glass sheet onto a collection spool.

Disclosed herein is a glass sheet comprising a first glass layer, a second glass layer adjacent to the first glass layer, and a thickness of at most about 0.1 mm.

Disclosed herein is an ion-exchanged glass sheet comprising a thickness of at most about 0.1 mm and a surface layer that is under a compressive stress and extends into an interior of the glass sheet to a depth of layer.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
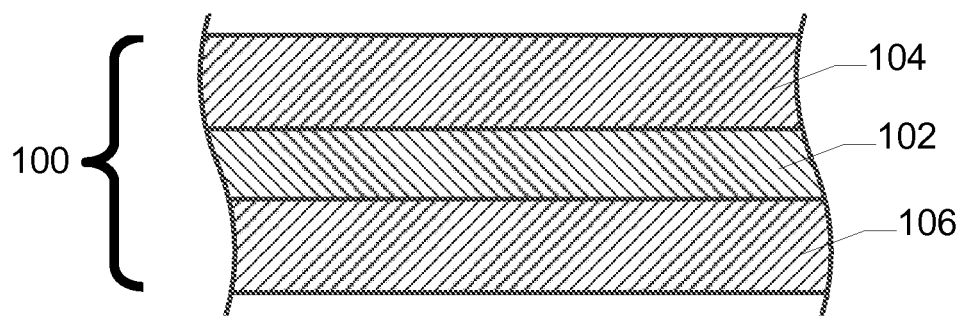
FIG. 1 is a partial cross-sectional view of one exemplary embodiment of a laminate structure of a glass sheet.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

A glass sheet can be formed using a suitable forming process such as, for example, a down draw process (e.g., a fusion draw process or a slot draw process) or a float process. Forming a glass sheet using such forming processes can become increasingly more difficult as the thickness of the formed glass sheet is decreased. Thus, it can be difficult or even impossible to directly form thin glass sheets using such forming processes.

A thin glass sheet can be formed by etching or grinding a thicker, single-layer glass sheet to reduce its thickness to the desired thickness. However, such etching and grinding processes can be costly, require the use of chemical etchants, and/or introduce flaws into the surface of the glass sheet.

In various embodiments, a method for forming a glass sheet comprises heating a glass preform comprising a plurality of glass layers. The plurality of glass layers comprises at least a first layer and a second layer. For example, the first layer comprises a core layer, and the second layer comprises one or more cladding layers adjacent to the core layer. Each glass layer independently comprises a glass, a glass-ceramic, or a combination thereof. In some embodiments, one or more of the glass layers are transparent glass layers. The glass preform can be planar (e.g., a flat sheet) or non-planar (e.g., a curved sheet). The method further comprises drawing the glass preform in a distal direction to form a drawn glass sheet extending distally from the glass preform. The drawn glass sheet comprises the plurality of glass layers (e.g., the core layer and the one or more cladding layers adjacent to the core layer). A thickness of the drawn glass sheet is less than a thickness of the glass preform. The drawn glass sheet can be rolled onto a collection spool. Additionally, or alternatively, one or more of the glass layers can be removed from the drawn glass sheet to further reduce the thickness of the drawn glass sheet. Additionally, or alternatively, an electronic device can be formed on the drawn glass sheet before or after the rolling step.

FIG. 1 is a cross-sectional view of a laminate structure of one exemplary embodiment of a glass preform 100. Glass preform 100 comprises a laminate structure comprising a plurality of glass layers. For example, glass preform 100 comprises a unitary laminate structure in which the glass layers are joined or fused together as opposed to merely being stacked adjacent to each other. Glass preform 100 can be substantially planar as shown in FIG. 1 or non-planar. In the embodiment shown in FIG. 1, glass preform 100 comprises a core layer 102 disposed between a first cladding layer 104 and a second cladding layer 106. In some embodiments, first cladding layer 104 and second cladding layer 106 are exterior layers as shown in FIG. 1. In other embodiments, the first cladding layer and/or the second cladding layer are intermediate layers disposed between the core layer and an exterior layer.

Core layer 102 comprises a first major surface and a second major surface opposite the first major surface. In some embodiments, first cladding layer 104 is fused to the first major surface of core layer 102. Additionally, or alternatively, second cladding layer 106 is fused to the second major surface of core layer 102. In such embodiments, the interfaces between first cladding layer 104 and core layer 102 and/or between second cladding layer 106 and core layer 102 are free of any bonding material such as, for example, a polymer interlayer, an adhesive, a coating layer, or any non-glass material added or configured to adhere the respective cladding layer to the core layer. Thus, first cladding layer 104 and/or second cladding layer 106 are fused directly to core layer 102 or are directly adjacent to core layer 102. In some embodiments, the glass preform comprises one or more intermediate layers disposed between the core layer and the first cladding layer and/or between the core layer and the second cladding layer. For example, the intermediate layers comprise intermediate glass layers and/or diffusion layers formed at the interface of the core layer and the cladding layer. The diffusion layer can comprise a blended region comprising components of each layer directly adjacent to the diffusion layer. In some embodiments, glass preform 100 comprises a glass-glass laminate (e.g., an in situ fused multilayer glass-glass laminate) in which the interfaces between directly adjacent glass layers are glass-glass interfaces.

In some embodiments, core layer 102 comprises a first glass composition, and first and/or second cladding layers 104 and 106 comprise a second glass composition that is different than the first glass composition. For example, in the embodiment shown in FIG. 1, core layer 102 comprises the first glass composition, and each of first cladding layer 104 and second cladding layer 106 comprises the second glass composition. In other embodiments, the first cladding layer comprises the second glass composition, and the second cladding layer comprises a third glass composition that is different than the first glass composition and/or the second glass composition.

Figure 2:
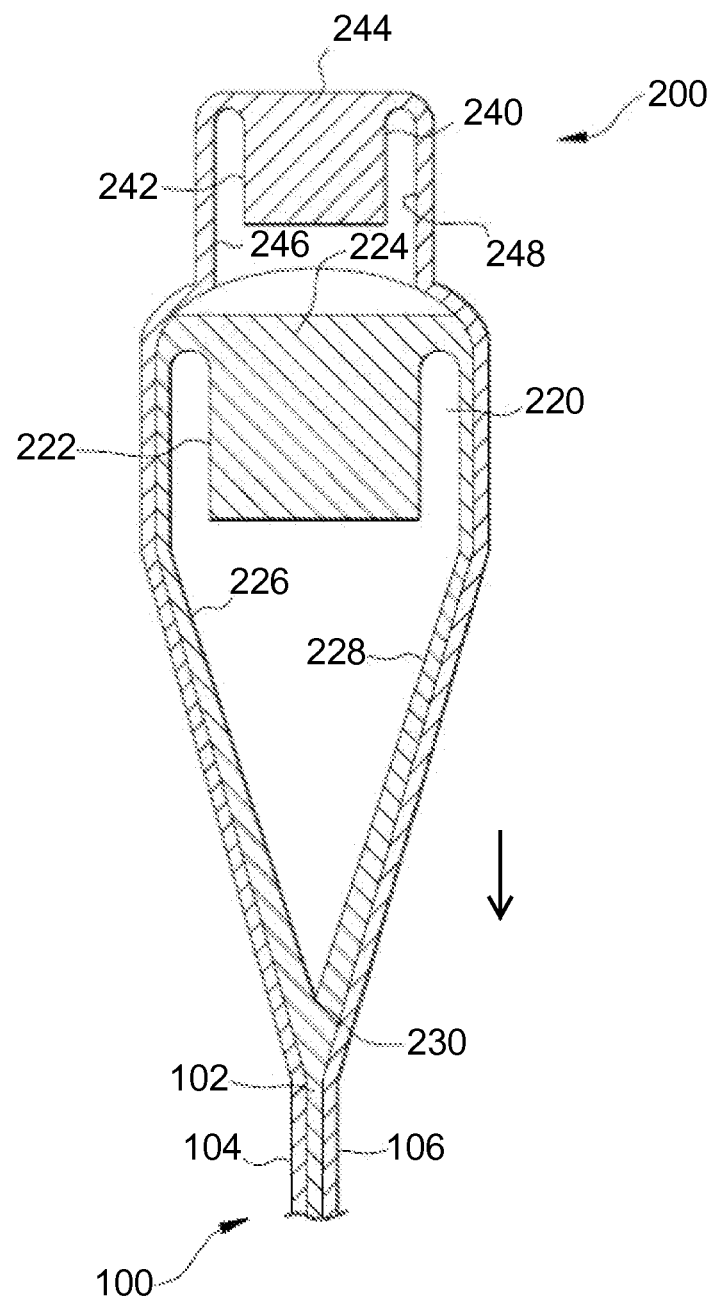
FIG. 2 is a cross-sectional view of one exemplary embodiment of a forming apparatus that can be used to form a glass sheet.

The glass preform can be formed using a suitable process such as, for example, a fusion draw, down draw, slot draw, up draw, or float process. In some embodiments, the glass preform is formed using a fusion draw process. FIG. 2 is a cross-sectional view of one exemplary embodiment of an overflow distributor 200 that can be used to form a glass preform such as, for example, glass preform 100. Overflow distributor 200 can be configured as described in U.S. Pat. No. 4,214,886, which is incorporated herein by reference in its entirety. For example, overflow distributor 200 comprises a lower overflow distributor 220 and an upper overflow distributor 240 positioned above the lower overflow distributor. Lower overflow distributor 220 comprises a trough 222. A first glass composition 224 is melted and fed into trough 222 in a molten or viscous state. First glass composition 224 forms core layer 102 of glass preform 100 as further described below. Upper overflow distributor 240 comprises a trough 242. A second glass composition 244 is melted and fed into trough 242 in a molten or viscous state. Second glass composition 244 forms first and second cladding layers 104 and 106 of glass preform 100 as further described below.

First glass composition 224 overflows trough 222 and flows down opposing outer forming surfaces 226 and 228 of lower overflow distributor 220. Outer forming surfaces 226 and 228 converge at a draw line 230. The separate streams of first glass composition 224 flowing down respective outer forming surfaces 226 and 228 of lower overflow distributor 220 converge at draw line 230 where they are fused together to form core layer 102 of glass preform 100.

Second glass composition 244 overflows trough 242 and flows down opposing outer forming surfaces 246 and 248 of upper overflow distributor 240. Second glass composition 244 is deflected outward by upper overflow distributor 240 such that the second glass composition flows around lower overflow distributor 220 and contacts first glass composition 224 flowing over outer forming surfaces 226 and 228 of the lower overflow distributor. The separate streams of second glass composition 244 are fused to the respective separate streams of first glass composition 224 flowing down respective outer forming surfaces 226 and 228 of lower overflow distributor 220. Upon convergence of the streams of first glass composition 224 at draw line 230, second glass composition 244 forms first and second cladding layers 104 and 106 of glass preform 100.

In some embodiments, first glass composition 224 of core layer 102 in the molten or viscous state is contacted with second glass composition 244 of first and second cladding layers 104 and 106 in the molten or viscous state to form glass preform 100. Additionally, or alternatively, glass preform 100 comprises a glass ribbon traveling away from draw line 230 of lower overflow distributor 220 as shown in FIG. 2. Glass preform 100 can be drawn away from lower overflow distributor 220 by a suitable means including, for example, gravity and/or pulling rollers. Glass preform 100 cools as it travels away from lower overflow distributor 220.

In some embodiments, a coating is applied to one or both outer surfaces of glass preform 100. The coating can be applied as a liquid (e.g., by spraying or dipping) or a film. The coating can aid in protecting the surfaces of glass preform 100 from damage and/or preserving the pristine quality of the fusion drawn sheet. For example, the coating comprises an interleaf configured to prevent surface-to-surface contact when glass preform 100 is rolled as described herein.

In some embodiments, glass preform 100 is rolled onto a spool for delivery to a redrawing unit as described herein. In other embodiments, glass preform 100 is delivered directly from overflow distributor 200 to the redrawing unit. Thus, a proximal end of glass preform 100 remains coupled to the overflow distributor 200 during the drawing of the glass preform as described herein. In other embodiments, glass preform 100 is severed to form glass preform segments that are delivered to the redrawing unit. Glass preform 100 can be severed using a suitable technique such as, for example, scoring, bending, thermally shocking, and/or laser cutting.

Although glass preform 100 shown in FIG. 1 comprises three layers, other embodiments are included in this disclosure. In other embodiments, a glass preform can have a determined number of layers, such as two, four, or more layers. For example, a glass preform comprising two layers can be formed using two overflow distributors positioned so that the two layers are joined while traveling away from the respective draw lines of the overflow distributors or using a single overflow distributor with a divided trough so that two glass compositions flow over opposing outer forming surfaces of the overflow distributor and converge at the draw line of the overflow distributor. A glass preform comprising four or more layers can be formed using additional overflow distributors and/or using overflow distributors with divided troughs. Thus, a glass preform having a determined number of layers can be formed by modifying the overflow distributor accordingly.

In some embodiments, glass preform 100 comprises a thickness of at least about 0.05 mm, at least about 0.1 mm, at least about 0.2 mm, or at least about 0.3 mm. Additionally, or alternatively, glass preform 100 comprises a thickness of at most about 5 mm, at most about 3 mm, at most about 2 mm, at most about 1.5 mm, at most about 1 mm, at most about 0.7 mm, at most about 0.5 mm, at most about 0.3 mm, or at most about 0.2 mm. For example, glass preform 100 comprises a thickness of from about 0.05 mm to about 5 mm, from about 0.1 mm to about 1 mm, from about 0.1 mm to about 0.7 mm, or from about 0.1 mm to about 0.3 mm. A preform thickness ratio of each glass layer of glass preform 100 comprises a ratio of a thickness of the respective glass layer to a thickness of the glass preform. In some embodiments, the preform thickness ratio of core layer 102 is at least about 0.5, at least about 0.7, at least about 0.8, at least about 0.85, at least about 0.9, or at least about 0.95. Additionally, or alternatively, the preform thickness ratio of core layer 102 is at most about 0.8, at most about 0.75, at most about 0.7, at most about 0.6, or at most about 0.5.

Figure 3:
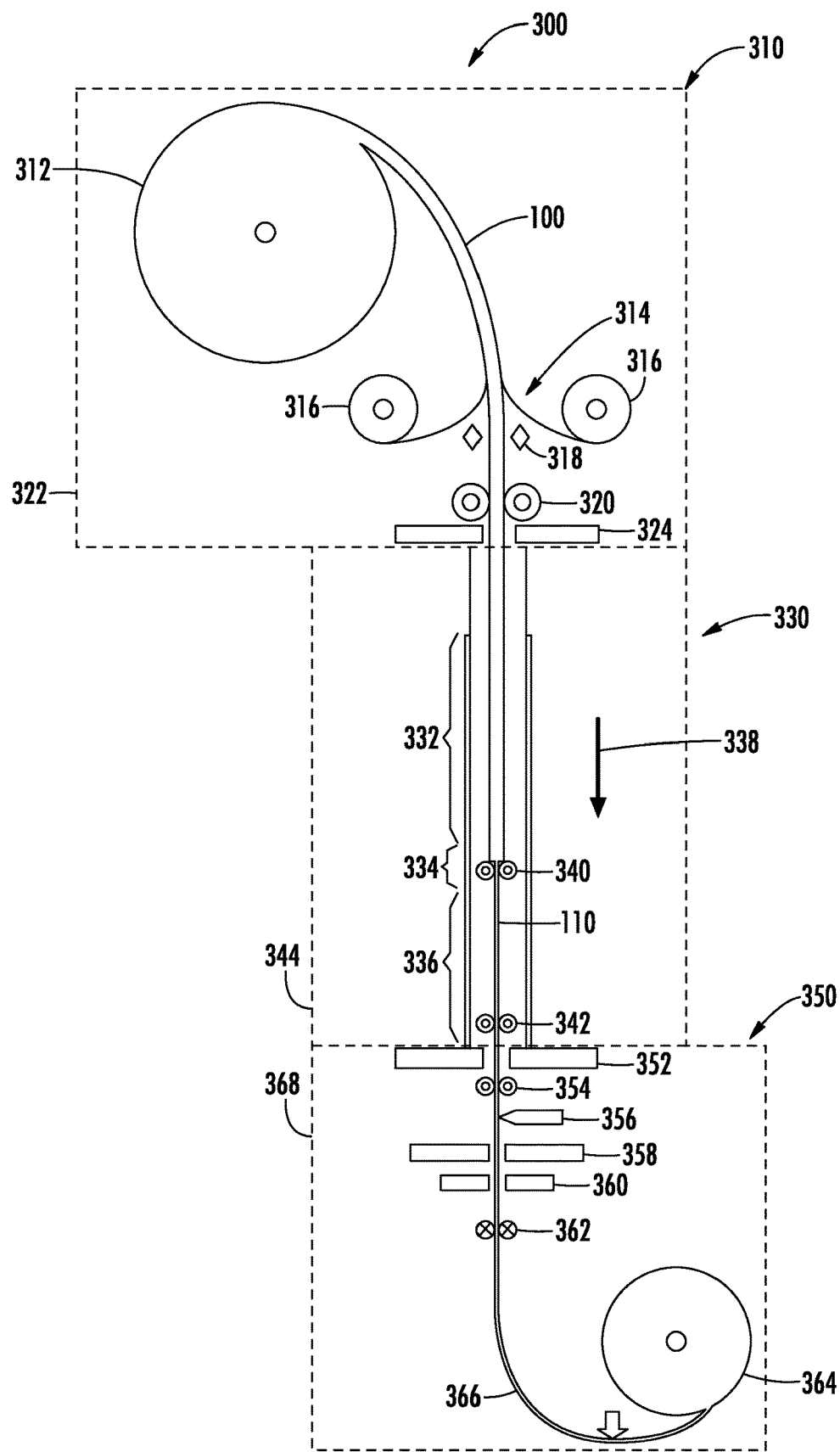
FIG. 3 is a schematic view of one exemplary embodiment of a redrawing system.

The glass preform can be drawn to form a drawn glass sheet that is thinner than the glass preform. Such a process can be described as a redrawing or reforming process. In some embodiments, the glass preform is drawn using a redrawing system. FIG. 3 is a schematic view of one exemplary embodiment of a redrawing system 300 that can be used to draw a glass preform such as, for example, glass preform 100. Redrawing system 300 comprises a feed unit 310, a drawing unit 330, and a collection unit 350.

In some embodiments, feed unit 310 comprises a delivery spool 312 as shown in FIG. 3. Glass preform 100 is provided on delivery spool 312 and fed to drawing unit 330 by unrolling the glass preform from the delivery spool. In other embodiments, the glass preform is provided in the form of a glass preform segment or sheet and delivered to drawing unit 330 by advancing the preform segment into the drawing unit. For example, the glass preform sheet is supported by a holding device that advances the preform sheet into the drawing unit. In yet other embodiments, the glass preform is provided in the form of a glass preform ribbon (e.g., coupled to a forming unit) and delivered to drawing unit 330 by advancing the distal end of the preform ribbon into the drawing unit.

In some embodiments, feed unit 310 comprises a stripping unit 314 that is configured to remove a coating from one or more surfaces of glass preform 100. For example, in the embodiment shown in FIG. 3, stripping unit 314 comprises a pair of stripping rollers 316 configured to remove a film from opposing surfaces of glass preform 100. In other embodiments, the stripping unit comprises a scrubbing unit (e.g., a brush), a spraying unit (e.g., to spray a solvent), a heating and/or cooling unit, or another suitable coating or film removal unit. Stripping unit 314 is positioned distal or downstream of delivery spool 312 to engage glass preform 100 as the glass preform is introduced into drawing unit 330.

In some embodiments, feed unit 310 comprises an anti-static device 318 that is configured to dissipate a charge buildup on one or more surfaces of glass preform 100. For example, a static charge can build up on the surfaces of glass preform 100 during removal of a film from the surface of the glass preform. Anti-static device 318 can provide a path for the static charge to dissipate so that the static charge is removed from the glass preform. Anti-static device 318 comprises a static bar, an ionizer, or another suitable static dissipating device. Anti-static device 318 is positioned distal or downstream of delivery spool 312 and/or stripping unit 314 to engage glass preform 100 as the glass preform is introduced into drawing unit 330.

In some embodiments, feed unit 310 comprises a feed driving unit 320 that is configured to drive or introduce glass preform 100 into drawing unit 330. For example, in the embodiment shown in FIG. 3, feed driving unit 320 comprises a pair of drive rollers that engage opposing surfaces of glass preform 100 to pull the glass preform from delivery spool 312 into drawing unit 330. The drive rollers engage glass preform 100 therebetween and rotate to pull the glass preform in the distal direction. In other embodiments, the feed driving unit comprises drive belts, gripping arms, or another suitable driving device. Feed driving unit 320 introduces glass preform 100 into drawing unit 330 at a feed rate. For example, the feed rate comprises the velocity at which glass preform 100 travels in the distal direction as it is introduced into drawing unit 330. Feed driving unit 330 is adjustable to adjust the feed rate. For example, the rotation rate of the drive rollers can be increased to increase the feed rate or decreased to decrease the feed rate. Feed driving unit 320 is positioned distal or downstream of delivery spool 312, stripping unit 314, and/or anti-static device 318 to introduce glass preform 100 into drawing unit 330.

In some embodiments, feed unit 310, or a portion thereof, is enclosed within a feed enclosure 322, which can aid in maintaining a controlled environment surrounding the various components of feed unit 310. For example, feed enclosure 322 comprises a cleanroom that prevents foreign particles and/or contaminants from being deposited on glass preform 100 as it is introduced into drawing unit 330. In some embodiments, feed enclosure 322 comprises an inert atmosphere therein. Additionally, or alternatively, feed enclosure 322 is configured to reduce static buildup therein.

In some embodiments, feed unit 310 comprises an aperture control device 324 disposed adjacent to drawing unit 330. For example, aperture control device 324 is disposed at an exit of feed enclosure 322 and/or at an entrance of drawing unit 330. Aperture control device 324 can aid in controlling the size of the opening through which glass preform 100 is introduced into drawing unit 330. In the embodiment shown in FIG. 3, aperture control device 324 comprises a pair of sliding doors that are movable toward one another to constrict the opening and away from one another to enlarge the opening. In other embodiments, the aperture control device comprises a shutter, an iris, or another suitable device. Aperture control device 324 can aid in sealing the opening between feed enclosure 322 and drawing unit 330 to restrict the gas flow (e.g., air flow) between the feed enclosure and the drawing unit, which can reduce the potential for foreign particles and/or contaminates to be swept through the opening.

Drawing unit 330 is positioned distal or downstream of feed unit 310 so that glass preform 100 can be advanced longitudinally in the distal direction from the feed unit into the drawing unit as described herein. Drawing unit 330 comprises a furnace, a lehr, or another suitable heating unit configured to heat a portion of the glass preform so that the glass preform can be drawn into a glass sheet and/or to cool a portion of the drawn glass sheet after the glass preform is drawn. In some embodiments, drawing unit 330 comprises a plurality of heating and/or cooling zones, each configured to heat or cool a portion of the glass preform and/or the drawn glass sheet passing through the drawing unit. For example, in the embodiment shown in FIG. 3, drawing unit 330 comprises a preheating zone 332, a heating zone 334, and a cooling zone 336. Each heating and/or cooling zone of drawing unit 330 comprises a heat plate (e.g., an induction plate and/or a resistance heater), an infrared heating device, an electromagnetic heating device, a torch, a laser, a fluid jet (e.g., an air jet or a water jet), or another suitable heating or cooling device. Additionally, or alternatively, one or more of the heating and/or cooling zones comprises a thermal spreader positioned between the heating and/or cooling element and glass preform 110. The thermal spreader can cause indirect heating and/or cooling of the glass preform to aid in heating and/or cooling the glass preform evenly (e.g., across the width of the glass preform). In other embodiments, the drawing unit can comprise additional heating and/or cooling zones, or one or more of the heating and/or cooling zones (e.g., the preheating zone and/or the cooling zone) can be omitted.

Preheating zone 332 is configured to heat a portion of glass preform 100 to a preheat temperature to form a preheated portion of the glass preform. In some embodiments, the preheat temperature is greater than or equal to a highest strain point of the plurality of glass layers. As used herein, the "strain point" of a glass layer is the temperature at which the viscosity of the glass layer is $10^{14.7}$ poise. Preheating unit 332 heats the portion of glass preform 100 to the preheat temperature at a preheating rate. For example, the preheating rate is from about 5° C./min to about 200° C./min, about 5° C./min to about 100° C./min, about 10° C./min to about 50° C./min, or about 15° C./min to about 30° C./min. In some embodiments, the preheating rate substantially matches the CTE curve of the glass preform. For example, a slope of the temperature of the portion of glass preform 100 as a function of time during the preheating is substantially the same as a slope of the effective CTE of the glass preform as a function of temperature. It should be recognized that, in this instance, CTE refers to the absolute CTE as opposed to the average CTE. Controlling the preheating rate can help to avoid introducing thermal stress in the glass preform, which can cause the glass preform to break or buckle uncontrollably.

Heating zone 334 is configured to heat a distal portion of glass preform 100 to an attenuation temperature. In some embodiments, heating zone 334 is positioned distal or downstream of preheating zone 332 such that the preheated portion of glass preform 100 is advanced longitudinally in the distal direction into the heating zone. For example, heating zone 334 is configured to heat the preheated portion of glass preform 100 to the attenuation temperature to form a heated portion of the glass preform. In some embodiments, the attenuation temperature is greater than or equal to a highest softening point of the plurality of glass layers. Additionally, or alternatively, the attenuation temperature is such that an effective viscosity of a central region of the glass preform at the attenuation temperature is from about 100 kP to about 10,000 kP. In some embodiments, a viscosity difference between the first glass composition and the second glass composition can be relatively high while maintaining the thickness ratios as described herein. For example, the viscosity difference between the first glass composition and the second glass composition is at most about 5 kP, such as about 0 kP to about 5 kP or about 1 kP to about 5 kP. This suggests that the first glass composition and the second glass composition do not flow relative to one another during the drawing of the glass preform. Heating zone 334 heats glass preform 100 to the attenuation temperature at a heating rate. For example, the heating rate is from about 5° C./min to about 200° C./min, about 5° C./min to about 100° C./min, about 10° C./min to about 50° C./min, or about 15° C./min to about 30° C./min.

In some embodiments, heating zone 334 is configured such that the heated portion of glass preform 100 has a relatively short length in the longitudinal direction. For example, the heated portion of glass preform 100 comprises a width extending in a transverse direction (corresponding to the width of glass preform 100) and a length extending in the longitudinal direction (corresponding to the length of the glass preform), and the length of the heated portion is at most about 10 cm, at most about 5 cm, at most about 3 cm, or at most about 0.5 cm. Thus, the heating rate is sufficiently high that the heated portion of glass preform 100 is maintained relatively short. Such a short heated portion can help to maintain the width of glass preform 100 in the heated portion and/or during drawing of the glass preform into the drawn glass sheet. For example, such a short heated portion can prevent the edges of glass preform 100 from being pulled inward during drawing of the glass preform. Additionally, or alternatively, the rate at which the glass preform is fed into the heating zone and/or the rate at which the drawn glass sheet is withdrawn from the heating zone can be increased to decrease the time that that the glass preform and/or the drawn glass sheet are exposed to the heating zone. Thus, the effective length of the heating zone can be shortened by increasing the rate at which the glass preform and/or the drawn glass sheet are passed through the heating zone. In some embodiments, the temperature of the heated portion of glass preform 100 is at least about 100° C., at least about 150° C., or at least about 200° C. greater than the temperature of the preheated portion of the glass preform. If the temperature of the preheated portion of the glass preform and the temperature of the heated portion of the glass preform attenuation zone are too close, attenuation can occur in the preheating zone. The preheat temperature should be sufficiently high to enable the glass to partially relax, but sufficiently low to prevent the glass from attenuating in the preheating zone, and the glass should be rapidly heated to the attenuation temperature. Thus, the heating zone is configured to change the temperature of the glass preform quickly over a relatively short longitudinal distance.

Glass preform 100 is drawn longitudinally in a distal direction (shown by arrow 338) to form a drawn glass sheet 110 extending distally from the glass preform as shown in FIG. 3. For example, the heated portion of glass preform 100 is drawn or pulled in distal direction 338, which causes the distal end of the glass preform to stretch and form drawn glass sheet 110. Thus, drawn glass sheet 110 comprises the plurality of glass layers, and a thickness of the drawn glass sheet is less than a thickness of glass preform 100. For example, drawn glass sheet 110 comprises the laminate structure shown in FIG. 1 and described with reference to glass preform 100. In some embodiments, a ratio of the thickness of glass preform 100 to the thickness of drawn glass sheet 110 is at least about 2, at least about 5, at least about 10, at least about 20, at least about 30, at least about 50, at least about 100, or at least about 200. Additionally, or alternatively, the ratio of the thickness of glass preform 100 to the thickness of drawn glass sheet 110 is at most about 300.

In some embodiments, drawn glass sheet 110 comprises a thickness of at most about 0.7 mm, at most about 0.5 mm, at most about 0.3 mm, at most about 0.2 mm, at most about 0.1 mm, at most about 0.05 mm, at most about 0.03 mm, at most about 0.02 mm, or at most about 0.01 mm. Additionally, or alternatively, drawn glass sheet 110 comprises a thickness of at least about 0.001 mm, at least about 0.01 mm, or at least about 0.05 mm. A sheet thickness ratio of each glass layer of drawn glass sheet 110 comprises a ratio of a thickness of the respective glass layer to a thickness of the drawn glass sheet. The sheet thickness ratio is calculated prior to removal of any glass layer from the drawn glass sheet as described herein. In some embodiments, the sheet thickness ratio of each glass layer is the same or substantially the same as the preform thickness ratio of the respective glass layer. In other words, the relative thicknesses of the glass layers are substantially unchanged upon drawing glass preform 100 into drawn glass sheet 110. For example, the sheet thickness ratio of each glass layer is within about 20%, within about 15%, within about 10%, within about 5%, or within about 2% of the preform thickness ratio of the respective glass layer. Thus, in some embodiments, the sheet thickness ratio of core layer 102 is at least about 0.7, at least about 0.8, at least about 0.85, at least about 0.9, or at least about 0.95. Additionally, or alternatively, the sheet thickness ratio of core layer 102 is at most about 0.8, at most about 0.75, at most about 0.7, at most about 0.6, or at most about 0.5.

Returning to FIG. 3, in some embodiments, drawing unit 330 comprises an edge guiding unit 340 that is configured to tension glass preform 100 and/or drawn glass sheet 110 in transverse and/or longitudinal directions. For example, in the embodiment shown in FIG. 3, edge guiding unit 340 comprises pairs of edge rollers (only one pair shown) configured to engage opposing edges of drawn glass sheet 110 to pull the drawn glass sheet outward toward the edges and tension the drawn glass sheet in the transverse direction. In other embodiments, the edge guiding unit comprises a belt, a gripping arm, or another suitable edge engaging device. In yet other embodiments, the edge guiding unit comprises one or more cooling devices (e.g., a fluid jet, a cooling radiator tube, or another suitable cooling device) configured to selectively cool opposing edge regions of the drawn glass sheet to pull the drawn glass sheet outward toward the edges and tension the drawn glass sheet in the transverse direction. Edge guiding unit 340 can be positioned at heating zone 334. Thus, edge guiding unit 340 tensions drawn glass sheet 110 while the glass sheet is at a sufficiently high temperature to stretch or deform under such tensioning. Additionally, or alternatively, edge guiding unit 340 can engage drawn glass sheet 100 at the opposing edges of the drawn glass sheet without engaging a central region of the drawn glass sheet positioned between the edges. Thus, the unengaged central region of the drawn glass sheet remains free of defects caused by contact with the edge guiding unit. Edge cooling and/or pulling (e.g., in the heating zone) can help to prevent buckling and minimize attenuation in the transverse direction.

Cooling zone 336 is configured to cool a portion of drawn glass sheet 110 to a cooling temperature. In some embodiments, cooling zone 336 is positioned distal or downstream of heating zone 334 such that a proximal portion of drawn glass sheet 110 adjacent to the heated portion of glass preform 100 is advanced distally into the cooling zone. For example, cooling zone 336 is configured to cool the proximal portion of drawn glass sheet 110 to the cooling temperature. In some embodiments, the cooling temperature is based on the glass compositions of the glass layers and is matched to minimize shape and stress in the drawn glass sheet. Additionally, or alternatively, the cooling temperature is less than or equal to a highest strain point of the plurality of glass layers. Cooling zone 336 cools drawn glass sheet 110 to the cooling temperature at a cooling rate. In some embodiments, the cooling rate is greater as the glass passes through the viscoelastic region than while the glass is below the viscoelastic region. Additionally, or alternatively, the cooling rate can match the CTE curve and/or the preheating rate. Such controlled cooling of the proximal portion of the drawn glass sheet can be sufficiently rapid to help set the width of the drawn glass sheet and sufficiently slow to minimize thermally induced shape distortions and/or stress.

In some embodiments, drawing unit 330 comprises a draw driving unit 342 that is configured to drive or withdraw drawn glass sheet 110 from drawing unit 330. For example, in the embodiment shown in FIG. 3, draw driving unit 342 comprises a pair of drive rollers that engage opposing surfaces of drawn glass sheet 110 to pull the drawn glass sheet through drawing unit 330. The drive rollers engage drawn glass sheet 110 therebetween and rotate to pull the drawn glass sheet longitudinally in the distal direction. In other embodiments, the draw driving unit comprises drive belts, gripping arms, or another suitable driving device. Draw driving unit 342 drive or withdraws drawn glass sheet 110 from drawing unit 330 at a draw rate. For example, the draw rate comprises the velocity at which drawn glass sheet 110 travels in the distal direction as it is withdrawn from drawing unit 330. Draw driving unit 342 is adjustable to adjust the draw rate. For example, the rotation rate of the drive rollers can be increased to increase the draw rate or decreased to decrease the draw rate. In some embodiments, the draw rate is greater than the feed rate. Thus, drawn glass sheet 110 is withdrawn from drawing unit 330 faster than glass preform 100 is introduced into the drawing unit. In some embodiments, a ratio of the draw rate to the feed rate is substantially the same as the ratio of the thickness of the glass preform to the thickness of the drawn glass sheet. For example, there can be an approximately linear relationship between a drawdown ratio and a speed ratio. Such a relationship between the draw rate and the feed rate can help to pull the heated distal region of the glass preform to form the drawn glass sheet extending therefrom. Draw driving unit 342 is positioned distal or downstream of preheating unit 332, heating unit 334 and/or cooling unit 336 to withdraw drawn glass sheet 110 from drawing unit 330. For example, draw driving unit 342 is positioned at cooling unit 336 or distal or downstream of the cooling unit such to engage a region of drawn glass sheet 110 that is at a temperature below the attenuation temperature (e.g., at the cooling temperature).

In some embodiments, drawing unit 330, or a portion thereof, is enclosed within a drawing enclosure 344, which can aid in maintaining a controlled environment surrounding the various components of the drawing unit. For example, drawing enclosure 344 comprises a cleanroom and/or an inert atmosphere therein.

Collection unit 350 is positioned distal or downstream of drawing unit 330 so that drawn glass sheet 110 can be advanced from the drawing unit into the collection unit as described herein. In some embodiments, collection unit 350 comprises an aperture control device 352 disposed adjacent to drawing unit 330. For example, aperture control device 352 is disposed at an exit of drawing enclosure 344 and/or at an entrance of collection unit 350. Aperture control device 352 can aid in controlling the size of the opening through which drawn glass sheet 110 is introduced into collection unit 350. Aperture control device 352 can be configured as described herein with reference to aperture control device 324.

In some embodiments, collection unit 350 comprises a collection driving unit 354 that is configured to drive or withdraw drawn glass sheet 110 from drawing unit 330 and/or through the collection unit. Collection driving unit 354 can be configured generally as described herein with reference to draw driving unit 342. For example, in the embodiment shown in FIG. 3, collection driving unit 354 comprises a pair of drive rollers that engage opposing surfaces of drawn glass sheet 110 to drive the drawn glass sheet through drawing unit 330 and/or collection unit 350. Collection driving unit 354 is adjustable to adjust the drive rate.

In some embodiments, collection unit 350 comprises a thickness measuring device 356 configured to measure the thickness of drawn glass sheet 110. Thickness measuring device comprises a laser measuring device, an ultrasonic measuring device, an interferometer, or another suitable measuring device. In some embodiments, one or more parameters of redrawing system 300 can be adjusted in response to the measured thickness. For example, if the measured thickness is below a target thickness, the ratio of the draw rate to the feed rate can be decreased, which can increase the thickness of drawn glass sheet 110. Alternatively, if the measured thickness is above the target thickness, the ratio of the draw rate to the feed rate can be increased, which can decrease the thickness of drawn glass sheet 110.

In some embodiments, collection unit 350 comprises a defect detection device 358 configured to detect defects in drawn glass sheet 110. Defect detection device 358 comprises a camera system, an interference fringe pattern system, a reflectance system, or another suitable detection system.

In some embodiments, collection unit 350 comprises a coating application device 360 configured to apply a coating to one or both outer surfaces of drawn glass sheet 110. Coating application device 360 comprises a liquid coating device (e.g., a spraying device, an evaporative application device, a dipping unit, a brushing device), a film application device (e.g., a roller), a deposition device (e.g., thermal deposition device), or another suitable application device. The coating can aid in protecting the surfaces of drawn glass sheet 110 from damage and/or preserving the pristine quality of the drawn sheet. For example, the coating comprises an interleaf configured to prevent surface-to-surface contact when drawn glass sheet 110 is rolled as described herein. The coating comprises a suitable coating material such as, for example, a polymer.

In some embodiments, collection unit 350 comprises a severing device 362 configured to sever drawn glass sheet 110. Severing device 362 comprises a score wheel, a scribing tip, a cutting disk, a laser, a torch, a fluid jet, a bending device, another suitable severing device, or a combination thereof. In some embodiments, severing device 362 severs drawn glass sheet 110 longitudinally (e.g., to adjust the width of the drawn glass sheet and/or to remove the beads from the drawn glass sheet). Additionally, or alternatively, severing device 362 comprises a plurality of severing devices positioned at different transverse positions along drawn glass sheet 110. For example, severing device 362 comprises a first severing device positioned near a first edge of drawn glass sheet 110 and a second severing device positioned near a second edge of the drawn glass sheet opposite the first edge. Each of the first severing device and the second severing device can sever drawn glass sheet 110 longitudinally. Thus, a relatively thick region or bead disposed at each edge of drawn glass sheet 110 can be removed from a central region of the drawn glass sheet disposed between the beads.

In some embodiments, collection unit 350 comprises a collection spool 364 to roll drawn glass sheet 110. For example, collection spool 364 comprises a substantially cylindrical body around which drawn glass sheet 110 is rolled as shown in FIG. 3. The spool diameter can be based on a bend radius of glass sheet 110. For example a thinner glass sheet can have a smaller bend radius than a thicker glass sheet. Thus, the thicker glass sheet can be collected on a larger diameter spool than the thinner glass sheet. The cylindrical body comprises a circular cross-sectional shape. In other embodiments, a cross-section of the collection spool can have a triangular, rectangular, elliptical, or another suitable polygonal or non-polygonal shape. In some embodiments, collection spool 364 is rotatable around an axis thereof. Such rotation can help to roll drawn glass sheet 110 around collection spool 364 and/or pull the drawn glass sheet through drawing unit 330 and/or collection unit 350. In some embodiments, rolling of drawn glass sheet 110 onto collection spool 364 is controlled by maintaining a free loop 366 in the drawn glass sheet and/or tension between collection driving unit 354 and the collection spool.

In some embodiments, collection unit 350, or a portion thereof, is enclosed within a collection enclosure 368, which can aid in maintaining a controlled environment surrounding the various components of the collection unit. For example, collection enclosure 368 comprises a cleanroom and/or an inert atmosphere therein.

In some embodiments, drawn glass sheet 100 comprises a flexible glass sheet. Such a flexible glass sheet can enable rolling of drawn glass sheet 110 onto the collection spool as described herein. Forming the drawn glass sheet using the process described herein can enable the drawn glass sheet to have pristine outer surfaces that are substantially free of defects (e.g., chips, cracks, scratches, or other defects). Additionally, or alternatively, drawn glass sheet 100 comprises one or more unpolished outer surfaces (e.g., outer surfaces that have not been subjected to a polishing or grinding process). Such pristine outer surfaces can enable bending of the drawn glass sheet to a relatively small bend radius without breaking the drawn glass sheet. For example, in some embodiments, drawn glass sheet 110 is capable of being bent to a bend radius that is within about 40%, within about 30%, or within about 20% of a theoretical minimum bend radius. The theoretical minimum bend radius represents the bend radius to which a drawn glass sheet of a specified thickness with a pristine or defect free surface can be bent without breakage. In some embodiments, drawn glass sheet 110 is capable of being bent to a bend radius of less than or equal to about 50 mm, less than or equal to about 40 mm, less than or equal to about 35 mm, less than or equal to about 30 mm, less than or equal to about 25 mm, less than or equal to about 20 mm, less than or equal to about 15 mm, or less than or equal to about 10 mm.

In some embodiments, drawn glass sheet 110 is configured as a strengthened glass sheet. For example, in some embodiments, the second glass composition of first and/or second cladding layers 104 and 106 comprises a different average coefficient of thermal expansion (CTE) than the first glass composition of core layer 102. For example, first and second cladding layers 104 and 106 are formed from a glass composition having a lower average CTE than core layer 102. As used herein, the term "average coefficient of thermal expansion" refers to the average coefficient of thermal expansion of a given material or layer between 0° C. and 300° C. As used herein, the term "coefficient of thermal expansion" refers to the average coefficient of thermal expansion unless otherwise indicated. The CTE mismatch (i.e., the difference between the average CTE of first and second cladding layers 104 and 106 and the average CTE of core layer 102) between directly adjacent layers results in formation of compressive stress in the cladding layers and tensile stress in the core layer upon cooling of drawn glass sheet 110. In various embodiments, each of the first and second cladding layers, independently, can have a higher average CTE, a lower average CTE, or substantially the same average CTE as the core layer.

In some embodiments, the average CTE of core layer 102 and the average CTE of first and/or second cladding layers 104 and 106 differ by at least about $5\times10^{-7}$ C.$^{-1}$, at least about $15\times10^{-7}$ C.$^{-1}$, at least about $25\times10^{-7}$ C.$^{-1}$, at least about $30\times10^{-7}$ C.$^{-1}$, at least about $40\times10^{-7}$ C.$^{-1}$, or at least about $50\times10^{-7}$ C.$^{-1}$. Additionally, or alternatively, the average CTE of core layer 102 and the average CTE of first and/or second cladding layers 104 and 106 differ by at most about $100\times10^{-7}$ C.$^{-1}$, at most about $75\times10^{-7}$ C.$^{-1}$, at most about $50\times10^{-7}$ C.$^{-1}$, at most about $40\times10^{-7}$ C.$^{-1}$, at most about $30\times10^{-7}$ C.$^{-1}$, at most about $20\times10^{-7}$ C.$^{-1}$, or at most about $10\times10^{-7}$ C.$^{-1}$. In some embodiments, the second glass composition of first and/or second cladding layers 104 and 106 comprises an average CTE of at most about $66\times10^{-7}$ C.$^{-1}$, at most about $55\times10^{-7}$ C.$^{-1}$, at most about $50\times10^{-7}$ C.$^{-1}$, at most about $40\times10^{-7}$ C.$^{-1}$, or at most about $35\times10^{-7}$ C.$^{-1}$. Additionally, or alternatively, the second glass composition of first and/or second cladding layers 104 and 106 comprises an average CTE of at least about $25\times10^{-7}$ C.$^{-1}$, or at least about $30\times10^{-7}$ C.$^{-1}$. Additionally, or alternatively, the first glass composition of core layer 102 comprises an average CTE of at least about $40\times10^{-7}$ C.$^{-1}$, at least about $50\times10^{-7}$ C.$^{-1}$, at least about $55\times10^{-7}$ C.$^{-1}$, at least about $65\times10^{-7}$ C.$^{-1}$, at least about $70\times10^{-7}$ C.$^{-1}$, at least about $80\times10^{-7}$ C.$^{-1}$, or at least about $90\times10^{-7}$ C.$^{-1}$. Additionally, or alternatively, the first glass composition of core layer 102 comprises an average CTE of at most about $110\times10^{-7}$ C.$^{-1}$, at most about $100\times10^{-7}$ C.$^{-1}$, at most about $90\times10^{-7}$ C.$^{-1}$, at most about $75\times10^{-7}$ C.$^{-1}$, or at most about $70\times10^{-7}$ C.$^{-1}$.

In some embodiments, the compressive stress of the cladding layers is at most about 800 MPa, at most about 500 MPa, at most about 350 MPa, or at most about 150 MPa. Additionally, or alternatively, the compressive stress of the cladding layers is at least about 10 MPa, at least about 20 MPa, at least about 30 MPa, at least about 50 MPa, or at least about 250 MPa. Additionally, or alternatively, the tensile stress of the core layer is at most about 150 MPa, at most about 120 MPa, or at most about 100 MPa. Additionally, or alternatively, the tensile stress of the core layer is at least about 5 MPa, at least about 10 MPa, at least about 25 MPa, or at least about 50 MPa.

Because the redraw method described herein is non-contact with respect to the central region of the drawn glass sheet and/or performed in a controlled environment, innate glass strength is maintained, which can be beneficial for producing thin strengthened laminate glass structures. Such strengthened laminate glass structures can be attainable through compressive surface and tensile internal glass stresses imposed by CTE mismatch of the glass compositions of a clad glass to a core glass or can be achieved through ion-exchange of the glass before, during, or after the reforming process. Strengthening also may be realized as a combination of the two techniques to strengthen the glass sheet or in combination with a tempering method. Such a strengthened thin or ultrathin laminate can be used in applications where bending, folding, or flexible glass articles or glass containing articles are beneficial (e.g., flexible electronic sheets, flexible displays, flexible cover sheets, flexible environmental or moisture barrier substrates or superstrates, waveguides for optical connectors, and glass membranes).

Since etching and polishing techniques act only on exposed surfaces, such techniques are unable to reduce internal core layer thickness. Moreover, such techniques impact the strength properties that are dictated by CTE mismatch, including core layer to total thickness ratio, when making strengthened ultrathin glass. The redraw process described herein enables the drawn glass sheet to have the same thickness ratios as the glass preform. In other words, the redraw process retains the original glass thickness ratios of the glass preform in the drawn glass sheet. In some embodiments, micro or nano thicknesses can be achieved with reformed ultra-thin glass. For example, multilayer glass laminates exceeding 3 glass layers can be redrawn to produce nano boundaries within a sheet where optical or other unique properties are desired.

In some embodiments, at least one of the plurality of glass layers of drawn glass sheet 110 is at least partially removed to form a thinned drawn glass sheet. For example, one or more layers of drawn glass sheet 110 are entirely or substantially entirely removed to reduce the thickness of the drawn glass sheet and form the thinned drawn glass sheet. In some embodiments, the second layer (e.g., first cladding layer 104 and/or second cladding layer 106) is at least partially removed from the drawn glass sheet. For example, one of first cladding layer 104 and second cladding layer 106 is removed from drawn glass sheet 110, leaving core layer 102 and the other cladding layer as a two-layer glass sheet. In some embodiments, each of first cladding layer 104 and second cladding layer 106 are removed from drawn glass sheet 110, leaving core layer 102 as a single-layer glass sheet. In some embodiments, the first layer (e.g., core layer 102) is removed from the drawn glass sheet to leave the second layer (e.g., first cladding layer 104 and/or second cladding layer 106) as one or more thinned glass sheets. For example, core layer 102 is removed from drawn glass sheet 110, leaving first cladding layer 104 and second cladding layer 106 as two single-layer glass sheets.

In some embodiments, the second layer (e.g., first cladding layer 104 and/or second cladding layer 106) is less durable than first layer (e.g., core layer 102). For example, in the embodiment shown in FIG. 1, first cladding layer 104 and second cladding layer 106 are less durable than core layer 102. The second glass composition (e.g., of first and second cladding layers 104 and 106) comprises a greater degradation rate in a reagent than the first glass composition (e.g., of core layer 102). Thus, the degradation rate of the first glass composition in the reagent is less than the degradation rate of the second glass composition in the reagent. In some embodiments, the degradation rate of the second glass composition in the reagent is at least 10 times greater than the degradation rate of the first glass composition in the reagent. In some embodiments, drawn glass sheet 110 is contacted with the reagent to remove at least a portion of first cladding layer 104 and/or second cladding layer 106 from core layer 102 and expose the outer surface of the core layer. The difference in durability between the cladding layers and the core layer can enable the cladding layers to be removed from the core layer by contacting the drawn glass sheet with the reagent to degrade or dissolve the cladding layers without substantially degrading or dissolving the core layer.

The reagent comprises a suitable component capable of degrading or dissolving one or more layers of the drawn glass sheet. For example, the reagent comprises an acid, a base, another suitable component, or a combination thereof. In some embodiments, the reagent comprises an acid such as, for example, a mineral acid (e.g., HCl, $HNO_3$, $H_2SO_4$, $H_3PO_4$, $H_3BO_3$, HBr, $HClO_4$, or HF), a carboxylic acid (e.g., $CH_3COOH$), or a combination thereof. For example, in some embodiments, the reagent comprises HCl (e.g., 50 vol % HCl in water). Additionally, or alternatively, the reagent comprises $HNO_3$. In some embodiments, the reagent comprises a base such as, for example, LiOH, NaOH, KOH, RbOH, CsOH, $Ca(OH)_2$, $Sr(OH)_2$, $Ba(OH)_2$, or a combination thereof.

In some embodiments, the reagent is substantially free of HF. HF reacts with many different oxides, and therefore, is highly reactive with most glass compositions. For example, HF reacts with silicon dioxide to form gaseous or water-soluble silicon fluorides. Contacting the core layer of the drawn glass sheet with a reagent comprising HF may result in reaction of the HF with the core layer, which can cause roughening or marring of the core layer surface. Using a reagent that is substantially free of HF may prevent substantial reaction of the reagent with the core layer to enable removal of the cladding layers from the core layer without damaging the core layer surface.

In some embodiments, ion exchange is caused between the second layer (e.g., first cladding layer 104 and/or second cladding layer 106) and the first layer (e.g., core layer 102). For example, smaller cations (e.g., monovalent alkali metal cations or divalent alkaline earth metal cations) present in core layer 102 are replaced with larger cations (e.g., monovalent alkali metal cations, divalent alkaline earth metal cations, or $Ag^+$) present in first cladding layer 104 and/or second cladding layer 106. For example, in some embodiments, $Na^+$ present in core layer 102 is replaced with $K^+$ present in first cladding layer 104 and/or second cladding layer 106. The smaller cations and the larger cations can have the same valence or oxidation state. The replacement of smaller cations with larger cations creates a surface layer in core layer 102 that is under compression or compressive stress (CS). The surface layer extends into the interior or bulk of core layer 102 to a depth of layer (DOL). This can aid in increasing the strength of the thinned drawn glass sheet (e.g., the single-layer or two-layer glass sheet) following removal of first cladding layer 104 and/or second cladding layer 106. Additionally, or alternatively, the surface layer can act as an embedded strengthened layer within the glass sheet (e.g., without or prior to removal of first cladding layer 104 and/or second cladding layer 106). The compressive stress in the surface layer is balanced by a tensile stress (TS) or central tension in an interior region of core layer 102. The ion exchange can be caused by a suitable method such as, for example, heating the glass sheet (e.g., during drawing of glass preform 100 into drawn glass sheet 110) prior to removing first cladding layer 104 and/or second cladding layer 106 from core layer 102. Such in situ ion exchange (e.g., during the redrawing process) can enable formation of an ion exchanged glass sheet that is thinner than can practicably be ion exchanged using conventional techniques. In some embodiments, each of first cladding layer 104 and second cladding layer 106 is removed from core layer 102 as described herein to form a thin single-layer ion exchanged glass sheet.

In some embodiments, the first layer (e.g., core layer 102) is less durable than the second layer (e.g., first cladding layer 104 and/or second cladding layer 106). For example, core layer 102 is less durable than first cladding layer 104 and second cladding layer 106. The first glass composition (e.g., of core layer 102) comprises a greater degradation rate in a reagent than the second glass composition (e.g., of first and second cladding layers 104 and 106). In some embodiments, drawn glass sheet 110 is contacted with the reagent to remove core layer 102 to separate first cladding layer 104 and second cladding layer 106 from each other. The difference in durability between the core layer and the cladding layers can enable the cladding layers to be separated from each other by contacting the drawn glass sheet with the reagent to degrade or dissolve the core layer without substantially degrading or dissolving the cladding layers.

Table 1 shows several exemplary glass compositions that can be used as the first glass composition (e.g., for the relatively more durable first layer) as described herein. Table 2 shows several exemplary glass compositions that can be used as the second glass composition (e.g., for the relatively less durable second layer) as described herein. The glass compositions shown in Tables 1 and 2 are merely exemplary, and other suitable glass compositions can be used within the scope of the present disclosure.

TABLE 1

Exemplary First Glass Compositions

| Sample | SiO2 (mol %) | $Al_2O_3$ (mol %) | $B_2O_3$ (mol %) | $Na_2O$ (mol %) | $K_2O$ (mol %) | MgO (mol %) | CaO (mol %) | $SnO_2$ (mol %) |
|---|---|---|---|---|---|---|---|---|
| 1-1 | 66 | 10.26 | 0.58 | 14.23 | 2.37 | 5.75 | 0.59 | 0.21 |
| 1-2 | 69.18 | 8.47 | 0 | 13.92 | 1.16 | 6.54 | 0.53 | 0.19 |

TABLE 1-continued

Exemplary First Glass Compositions

| Sample | SiO2 (mol %) | Al₂O₃ (mol %) | B₂O₃ (mol %) | Na₂O (mol %) | K₂O (mol %) | MgO (mol %) | CaO (mol %) | SnO₂ (mol %) |
|---|---|---|---|---|---|---|---|---|
| 1-3 | 68.84 | 10.63 | 0 | 14.86 | 0.02 | 5.43 | 0.04 | 0.17 |
| 1-4 | 67.45 | 12.69 | 3.67 | 13.67 | 0.02 | 2.36 | 0.03 | 0.09 |

TABLE 2

Exemplary Second Glass Compositions

| Sample | SiO₂ (mol %) | Al₂O₃ (mol %) | B₂O₃ (mol %) | CaO (mol %) | Li₂O (mol %) | Na₂O (mol %) | K₂O (mol %) | SnO₂ (mol %) | ZrO₂ (mol %) | P₂O₅ (mol %) |
|---|---|---|---|---|---|---|---|---|---|---|
| 2-1 | 57 | 18.8 | 5 | 0 | 0 | 18.7 | 0.5 | 0.1 | 0.02 | 0 |
| 2-2 | 55 | 18.8 | 7 | 0 | 0 | 18.7 | 0.5 | 0.1 | 0.02 | 0 |
| 2-3 | 53 | 18.8 | 9 | 0 | 0 | 18.7 | 0.5 | 0.1 | 0.02 | 0 |
| 2-4 | 51 | 18.8 | 11 | 0 | 0 | 18.7 | 0.5 | 0.1 | 0.02 | 0 |
| 2-5 | 49 | 18.8 | 13 | 0 | 0 | 18.7 | 0.5 | 0.1 | 0.02 | 0 |
| 2-6 | 57 | 18.8 | 5 | 0 | 2 | 16.7 | 0.5 | 0.1 | 0.02 | 0 |
| 2-7 | 57 | 18.8 | 5 | 0 | 4 | 14.7 | 0.5 | 0.1 | 0.02 | 0 |
| 2-8 | 57 | 18.8 | 5 | 0 | 8 | 10.7 | 0.5 | 0.1 | 0.02 | 0 |
| 2-9 | 57 | 18 | 7 | 0 | 0 | 18 | 0 | 0.1 | 0 | 0 |
| 2-10 | 57 | 17 | 9 | 0 | 0 | 17 | 0 | 0.1 | 0 | 0 |
| 2-11 | 57 | 16 | 11 | 0 | 0 | 16 | 0 | 0.1 | 0 | 0 |
| 2-12 | 57 | 15 | 13 | 0 | 0 | 15 | 0 | 0.1 | 0 | 0 |
| 2-13 | 57.13 | 13.96 | 15.16 | 0.02 | 0 | 13.63 | 0 | 0.09 | 0 | 0 |
| 2-14 | 57 | 13 | 17 | 0 | 0 | 13 | 0 | 0.1 | 0 | 0 |
| 2-15 | 57.9 | 15 | 10 | 2 | 0 | 15 | 0 | 0.1 | 0 | 0 |
| 2-16 | 57.9 | 15 | 10 | 2 | 0 | 12 | 3 | 0.1 | 0 | 0 |
| 2-17 | 57.9 | 15 | 10 | 2 | 0 | 9 | 6 | 0.1 | 0 | 0 |
| 2-18 | 57.9 | 15 | 10 | 2 | 0 | 6 | 9 | 0.1 | 0 | 0 |
| 2-19 | 57.9 | 15 | 10 | 2 | 0 | 3 | 12 | 0.1 | 0 | 0 |
| 2-20 | 55 | 15 | 13 | 2 | 0 | 6 | 9 | 0.1 | 0 | 0 |
| 2-21 | 55 | 15 | 13 | 2 | 0 | 9 | 6 | 0.1 | 0 | 0 |
| 2-22 | 55 | 15 | 13 | 2 | 0 | 12 | 3 | 0.1 | 0 | 0 |
| 2-23 | 55 | 15 | 13 | 2 | 0 | 15 | 0 | 0.1 | 0 | 0 |
| 2-24 | 53 | 15 | 15 | 2 | 0 | 6 | 9 | 0.1 | 0 | 0 |
| 2-25 | 53 | 15 | 15 | 2 | 0 | 9 | 6 | 0.1 | 0 | 0 |
| 2-26 | 53 | 15 | 15 | 2 | 0 | 12 | 3 | 0.1 | 0 | 0 |
| 2-27 | 53 | 15 | 15 | 2 | 0 | 15 | 0 | 0.1 | 0 | 0 |
| 2-28 | 51 | 15 | 17 | 2 | 0 | 6 | 9 | 0.1 | 0 | 0 |
| 2-29 | 51 | 15 | 17 | 2 | 0 | 9 | 6 | 0.1 | 0 | 0 |
| 2-30 | 51 | 15 | 17 | 2 | 0 | 12 | 3 | 0.1 | 0 | 0 |
| 2-31 | 51 | 15 | 17 | 2 | 0 | 15 | 0 | 0.1 | 0 | 0 |
| 2-32 | 56 | 16 | 11 | 2 | 0 | 16 | 0 | 0.07 | 0 | 0 |
| 2-33 | 56 | 16 | 11 | 4 | 0 | 16 | 0 | 0.07 | 0 | 0 |
| 2-34 | 56 | 18 | 7 | 1 | 0 | 18 | 0 | 0.07 | 0 | 0 |
| 2-35 | 56 | 18 | 7 | 2 | 0 | 18 | 0 | 0.07 | 0 | 0 |
| 2-36 | 56 | 18 | 7 | 4 | 0 | 18 | 0 | 0.07 | 0 | 0 |
| 2-37 | 55 | 17 | 11 | 0 | 0 | 17 | 0 | 0.07 | 0 | 0 |
| 2-38 | 54 | 17.5 | 11 | 0 | 0 | 17.5 | 0 | 0.07 | 0 | 0 |
| 2-39 | 53 | 18 | 11 | 0 | 0 | 18 | 0 | 0.07 | 0 | 0 |
| 2-40 | 55 | 16 | 13 | 0 | 0 | 16 | 0 | 0.07 | 0 | 0 |
| 2-41 | 54 | 16 | 14 | 0 | 0 | 16 | 0 | 0.07 | 0 | 0 |
| 2-42 | 53 | 16 | 15 | 0 | 0 | 16 | 0 | 0.07 | 0 | 0 |
| 2-43 | 57 | 17.5 | 7 | 0 | 0 | 18.5 | 0 | 0.1 | 0 | 0 |
| 2-44 | 57 | 17 | 7 | 0 | 0 | 19 | 0 | 0.1 | 0 | 0 |
| 2-45 | 57 | 16.5 | 7 | 0 | 0 | 19.5 | 0 | 0.1 | 0 | 0 |
| 2-46 | 57 | 16 | 7 | 0 | 0 | 20 | 0 | 0.1 | 0 | 0 |
| 2-47 | 57 | 15.5 | 7 | 0 | 0 | 20.5 | 0 | 0.1 | 0 | 0 |
| 2-48 | 57 | 15 | 7 | 0 | 0 | 21 | 0 | 0.1 | 0 | 0 |
| 2-49 | 49 | 15 | 19 | 2 | 0 | 15 | 0 | 0.1 | 0 | 0 |
| 2-50 | 47 | 15 | 21 | 2 | 0 | 15 | 0 | 0.1 | 0 | 0 |
| 2-51 | 45 | 15 | 23 | 2 | 0 | 15 | 0 | 0.1 | 0 | 0 |
| 2-52 | 57 | 16 | 11 | 10 | 0 | 16 | 0 | 0.1 | 0 | 0 |
| 2-53 | 57 | 14.5 | 14 | 0 | 0 | 14.5 | 0 | 0 | 0 | 0 |
| 2-54 | 57 | 15 | 13 | 2 | 0 | 15 | 0 | 0 | 0 | 0 |
| 2-55 | 57 | 14.5 | 14 | 2 | 0 | 14.5 | 0 | 0 | 0 | 0 |
| 2-56 | 57 | 14 | 15 | 2 | 0 | 14 | 0 | 0 | 0 | 0 |
| 2-57 | 57 | 17.5 | 7 | 1 | 0 | 18.5 | 0 | 0.1 | 0 | 0 |
| 2-58 | 57 | 17.5 | 7 | 2 | 0 | 18.5 | 0 | 0.1 | 0 | 0 |
| 2-59 | 57 | 17.5 | 7 | 0 | 0 | 19.5 | 0 | 0.1 | 0 | 0 |
| 2-60 | 57 | 17.5 | 7 | 0 | 0 | 18.5 | 0 | 0.1 | 0 | 3 |
| 2-61 | 57 | 17.5 | 7 | 0 | 0 | 18.5 | 0 | 0.1 | 0 | 6 |
| 2-62 | 53 | 14.5 | 17 | 1 | 0 | 14.5 | 0 | 0.1 | 0 | 0 |

TABLE 2-continued

Exemplary Second Glass Compositions

| Sample | SiO$_2$ (mol %) | Al$_2$O$_3$ (mol %) | B$_2$O$_3$ (mol %) | CaO (mol %) | Li$_2$O (mol %) | Na$_2$O (mol %) | K$_2$O (mol %) | SnO$_2$ (mol %) | ZrO$_2$ (mol %) | P$_2$O$_5$ (mol %) |
|---|---|---|---|---|---|---|---|---|---|---|
| 2-63 | 51 | 14.75 | 18 | 1.5 | 0 | 14.75 | 0 | 0.1 | 0 | 0 |
| 2-64 | 57 | 18.8 | 5 | 0 | 0 | 18.7 | 0.5 | 0.1 | 0.02 | 0 |
| 2-65 | 57 | 18 | 7 | 10 | 0 | 18 | 0 | 0.1 | 0 | 0 |
| 2-66 | 57 | 17 | 9 | 10 | 0 | 17 | 0 | 0.1 | 0 | 0 |
| 2-67 | 57 | 17.5 | 7 | 4 | 0 | 18.5 | 0 | 0.1 | 0 | 0 |
| 2-68 | 60 | 15.38 | 0 | 0 | 0 | 16.49 | 0 | 0.1 | 0 | 5.15 |

Removal of one or more layers from the drawn glass sheet can enable formation of glass sheets that are thinner than can practicably be achieved using conventional forming techniques. In some embodiments, the glass preform and the drawn glass sheet comprise a relatively thin core and a relatively thick clad. For example, the glass preform comprises a thickness of 100 µm and a preform thickness ratio of the core layer is 0.8. Thus, the core layer comprises a thickness of 80 µm, and each of the first and second cladding layers comprises a thickness of 10 µm. The glass preform is drawn such that the drawn glass sheet comprises a thickness of 1.25 µm. Thus, the core layer comprises a thickness of 1 µm, and each of the first and second cladding layers comprises a thickness of 0.125 µm. Each of the first and second cladding layers is removed as described herein to form a thinned drawn glass sheet having a thickness of 1 µm.

Figure 4:
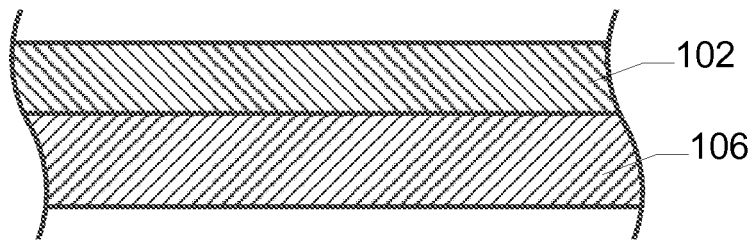
FIG. 4 is a partial cross-sectional view of the glass sheet shown in FIG. 1 with one glass layer removed to form a two-layer glass sheet.
Figure 5:
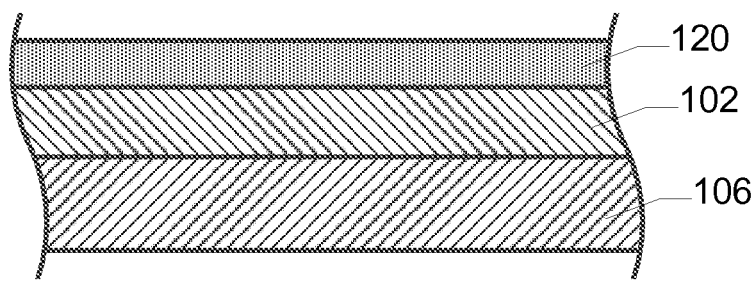
FIG. 5 is a partial cross-sectional view of one exemplary embodiment of an electronic device formed on the two-layer glass sheet shown in FIG. 4.
Figure 6:
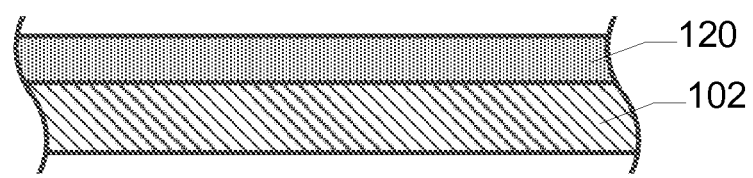
FIG. 6 is a partial cross-sectional view of the electronic device and glass sheet shown in FIG. 5 with one layer of the glass sheet removed to form a single-layer glass sheet.

The drawn glass sheet and/or the thinned drawn glass sheet can provide a substrate for an electronic device. In some embodiments, an outer layer is removed from a drawn glass sheet. For example, first cladding layer 104 is removed from drawn glass sheet 100 to expose a surface of core layer 102 and form a two-layer glass sheet as shown in FIG. 4. Thus, the two-layer glass sheet comprises core layer 102 and second cladding layer 106. An electronic device 120 is formed on the exposed surface of core layer 102 as shown in FIG. 5. Electronic device 120 is formed by a suitable method such as, for example, lithography (e.g., photolithography, electron beam lithography, X-ray lithography, or ion-beam lithography), printing (e.g., inkjet printing, gravure printing, or screen printing), deposition (e.g., physical vapor deposition or chemical vapor deposition) or a combination thereof. Additionally, or alternatively, electronic device 120 comprises one or more suitable electronic devices such as, for example, a resistor, a capacitor, a diode, a transistor, or combinations thereof. For example, electronic device 120 comprises a thin film transistor (TFT). Subsequent to forming electronic device 120, another outer layer is removed from the drawn glass sheet. For example, second cladding layer 106 is removed from drawn glass sheet 110 to form a single-layer glass sheet with electronic device 120 formed thereon as shown in FIG. 6. Thus, core layer 102 serves as a substrate for electronic device 120. Second cladding layer 106 can help to provide structural support or rigidity to core layer 102 during formation of electronic device 120 thereon, and then the second cladding layer can be removed to leave the core layer as a thin and/or flexible substrate for the electronic device. In some embodiments, core layer 102 is free or substantially free of alkali metal oxide components. For example, the concentration of alkali metal oxide components in the core layer is at most about 0.3 mol %, at most about 0.2 mol %, or at most about 0.1 mol %. Such alkali metal oxide components can interfere with operation of certain electronic device such as, for example, touch sensors. Thus, providing an alkali free core layer can enable formation of the electronic device on the surface of the core layer without interfering with the operation of the electronic device. In some embodiments, core layer 102 with electronic device 120 formed thereon can be used in a flexible electronics application such as, for example, as part of a flexible display.

In some embodiments, an inner layer is removed from a drawn glass sheet. For example, core layer 102 is removed from drawn glass sheet 100 to separate first cladding layer 104 and second cladding layer 106 from each other and form a two thinned glass sheets (e.g., two single-layer glass sheets). In some embodiments, an electronic device is formed on one or both outer surfaces of drawn glass sheet 100 (e.g., on the outer surface of first cladding layer 104 and/or second cladding layer 106) prior to removal of core layer 102. Upon separation of first cladding layer 104 and second cladding layer 106, one or both of the cladding layers serves as a substrate for the electronic device. Forming the electronic device while the cladding layers are joined by the core layer can help to provide structural support or rigidity during formation of the electronic device. Subsequent separation of the cladding layers can leave one or both of the cladding layers as a thin and/or flexible substrate for the electronic device. In some embodiments, first cladding layer 104 and/or second cladding layer 106 are free or substantially free of alkali metal oxide components. In some embodiments, first cladding layer 104 and/or second cladding layer 106 with the electronic device formed thereon can be used in a flexible electronics application such as, for example, as part of a flexible display.

Figure 7:
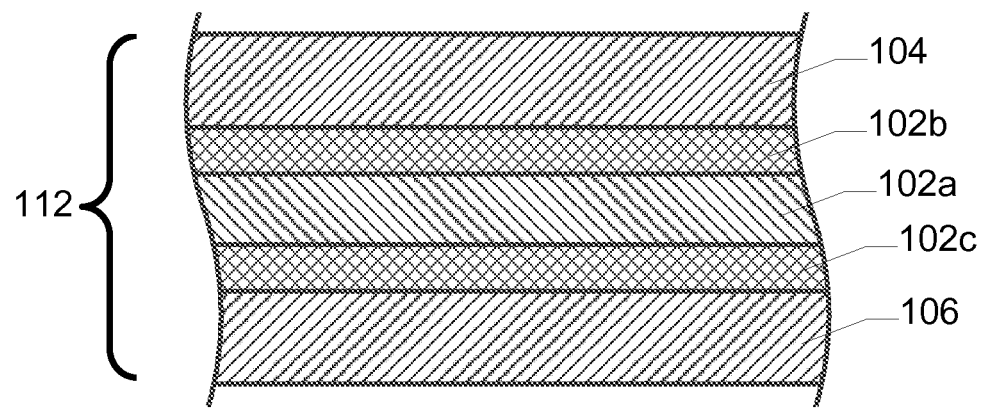
FIG. 7 is a partial cross-sectional view of another exemplary embodiment of a laminate structure of a glass sheet.

In some embodiments, the process described herein can be used to form a drawn glass sheet comprising nanometer scale barrier layers within the drawn glass sheet. For example, FIG. 7 is a cross-sectional view of a laminate structure of another exemplary embodiment of a glass preform 112. Glass preform 112 is similar to glass preform 100 except that the core layer of glass preform 112 comprises an inner core layer 102a, a first outer core layer 102b, and a second outer core layer 102c. Thus, glass preform 112 comprises a five-layer laminate structure. The core layer is disposed between first cladding layer 104 and second cladding layer 106, and inner core layer 102a is disposed between first outer core layer 102b and second outer core layer 102c. Glass preform 112 can be drawn as described herein to form a drawn glass sheet comprising the five-layer laminate structure. Such a drawing process can maintain the thickness ratios of the various layers. Thus, starting with relatively thin outer core layers in the glass preform can enable formation of a drawn glass sheet comprising thin barrier layers between the inner core layer and each of the cladding layers. Such a structure could not be formed from the glass preform using an etching or grinding process that acts only on outer surfaces of a glass sheet. In some embodiments, first outer core layer 102b and/or second outer core layer 102c of the drawn glass sheet comprises a thickness of at least about 10 nm, at least about 20 nm, or at least about 40 nm. Additionally, or alternatively, first outer core layer 102b and/or second outer core layer 102c of the drawn glass sheet comprises a thickness of at most about 100 nm, at most about 90 nm, or at most about 80 nm. For example, glass preform 112 comprises a thickness of 5 mm. Each of first outer core layer 102b and second outer core layer 102c comprises a thickness of 10 μm. Glass preform 112 is drawn to form a drawn glass sheet comprising a thickness of 20 μm. Thus, each of first outer core layer 102b and second outer core layer 102c of the drawn glass sheet comprises a barrier layer between inner core layer 102a and one of first cladding layer 104 or second cladding layer 106 and comprising a thickness of 40 nm.

In various embodiments, the drawn glass sheet and/or the thinned drawn glass sheet can have a thickness that is less than can be achieved using conventional forming techniques. Additionally, or alternatively, the drawn glass sheet and/or the thinned drawn glass sheet can have a pristine surface associated with fusion drawn glass sheets, without the surface damage that can be caused by grinding and/or etching processes.

The glass sheets described herein can be used for a variety of applications including, for example, for cover glass or glass backplane applications in consumer or commercial electronic devices including, for example, LCD, LED, OLED, and quantum dot displays, computer monitors, and automated teller machines (ATMs); for touch screen or touch sensor applications, for portable electronic devices including, for example, mobile telephones, personal media players, and tablet computers; for integrated circuit applications including, for example, semiconductor wafers; for photovoltaic applications; for architectural glass applications (e.g., walls, backsplashes, or cabinets); for automotive or vehicular glass applications; for commercial or household appliance applications; for lighting or signage (e.g., static or dynamic signage) applications; or for transportation applications including, for example, rail and aerospace applications.

Example

Figure 8:
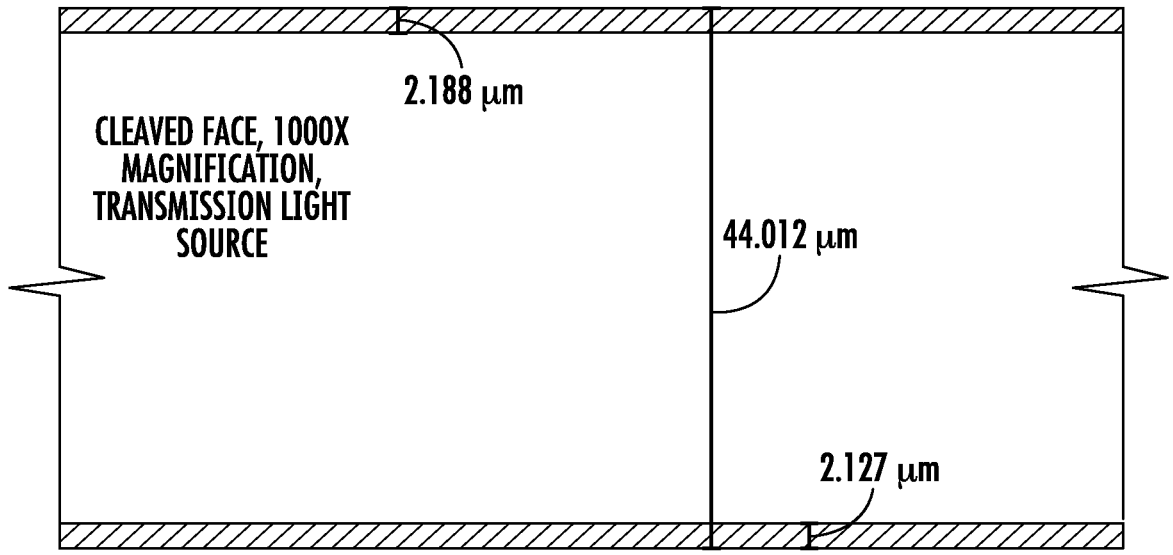
FIG. 8 is a photograph of a cross-section of one exemplary embodiment of a drawn glass sheet.

A three-layer glass preform having the laminate structure shown in FIG. 1 and a thickness of 0.7 mm was formed using a fusion draw process. The core layer had a thickness of about 620 μm, and each of the first and second cladding layers had a thickness of about 40 μm. Thus, the preform thickness ratio of the core layer was about 0.9. The glass preform was drawn to form a drawn glass sheet with a thickness of 44 μm. FIG. 8 is a photograph of a cross-section of the drawn glass sheet. The core layer had a thickness of about 40 μm, and each of the first and second cladding layers had a thickness of about 2 μm. Thus, the sheet thickness ratio of the core layer was about 0.9.

Figure 9:
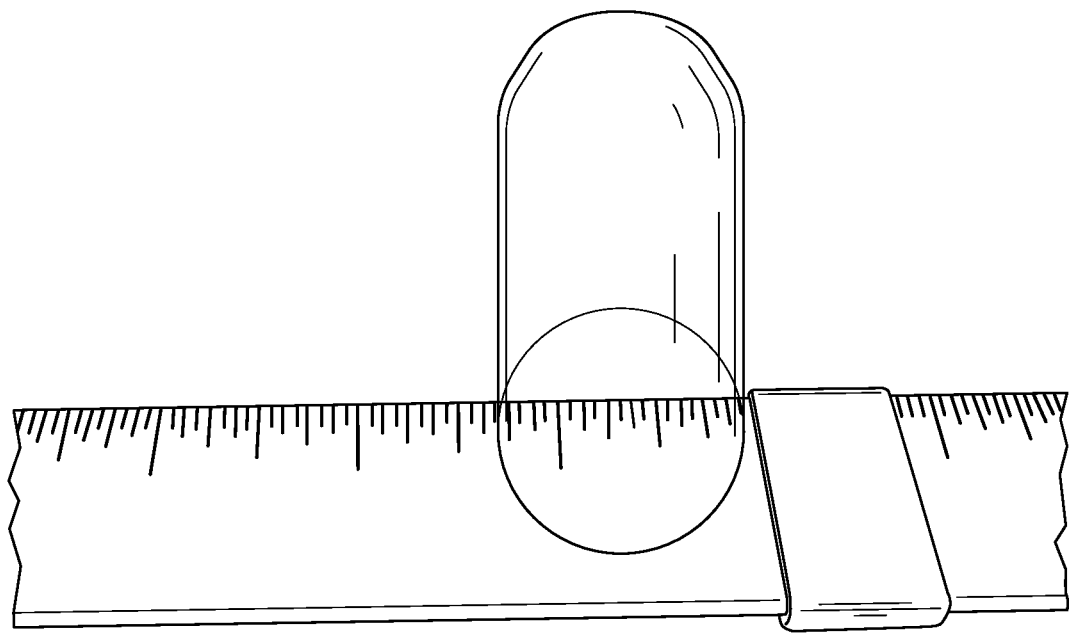
FIG. 9 is a photograph of the drawn glass sheet shown in FIG. 8 being bent to a bend radius.

FIG. 9 is a photograph showing the drawn glass sheet being bent to a radius. The drawn glass sheet was capable of being bent to a radius of about 31 mm, compared to its theoretical minimum bend radius of 26 mm.

It will be apparent to those skilled in the art that various modifications and variations can be made without departing from the spirit or scope of the invention. Accordingly, the invention is not to be restricted except in light of the attached claims and their equivalents.

What is claimed is:

1. A method comprising:
  contacting a first glass composition of a first glass layer in a viscous state with a second glass composition of a second glass layer in a viscous state to form a glass preform comprising a plurality of glass layers;
  heating a glass preform comprising a first glass layer and a second glass layer adjacent to the first glass layer;
  drawing the glass preform in a distal direction to form a drawn glass sheet extending distally from the glass preform and comprising the first glass layer and the second glass layer, a thickness of the drawn glass sheet being less than a thickness of the glass preform, wherein the thickness of the drawn glass sheet is at most 0.1 mm; and
  removing at least a portion of the second glass layer from the drawn glass sheet to expose a surface of the first glass layer,
  wherein the second glass layer comprises a first cladding layer and a second cladding layer, and the first glass layer comprises a core layer disposed between the first cladding layer and the second cladding layer, and forming an electronic device on a surface of the first glass layer prior to the removing step.

2. A method according to claim 1 further comprising:
  pre-heating the glass preform comprising the plurality of glass layers to a first temperature in a preheating zone;
  wherein the step of heating said glass preform comprises heating said glass preform-to a second temperature that is greater than the first temperature in a heating zone after the glass preform is advanced in a distal direction from the preheating zone;
  rolling the drawn glass sheet onto a collection spool.

3. The method of claim 2 wherein the glass sheet comprises a first glass layer, a second glass layer adjacent to the first glass layer, and a thickness of at most about 0.1 mm.

4. The method of claim 2, wherein the glass preform comprises a unitary laminate structure comprising the plurality of glass layers.

5. The method of claim 2, wherein:
  a preform thickness ratio of each of the plurality of glass layers comprises a ratio of a thickness of the respective glass layer in the glass preform to the thickness of the glass preform;
  a sheet thickness ratio of each of the plurality of glass layers comprises a ratio of the thickness of the respective glass layer in the drawn glass sheet to the thickness of the drawn glass sheet; and
  the preform thickness ratio of each of the plurality of glass layers is substantially the same as the sheet thickness ratio of the respective glass layer.

6. The method of claim 2, wherein the plurality of glass layers comprises a first glass layer and a second glass layer adjacent to the first glass layer.

7. The method of claim 2, wherein the plurality of glass layers comprises a core layer disposed between a first cladding layer and a second cladding layer, and the method comprises removing at least a portion of the core layer from the drawn glass sheet to separate the first cladding layer and the second cladding layer from each other.

8. The method of claim 2, wherein:
  the plurality of glass layers comprises a core layer disposed between a first cladding layer and a second cladding layer; and
  an average coefficient of thermal expansion (CTE) of the core layer is greater than an average CTE of each of the first cladding layer and the second cladding layer.

9. The method of claim 2, wherein the plurality of glass layers comprises a core layer disposed between a first cladding layer and a second cladding layer, and the method further comprises chemically strengthening the core layer by ion exchange with each of the first cladding layer and the second cladding layer.

10. The method of claim 9, further comprising removing the first cladding layer and the second cladding layer from the strengthened core layer subsequent to the drawing step and the chemically strengthening step.

11. The method of claim 1, wherein a degradation rate of the second glass layer in a reagent is greater than a degradation rate of the first glass layer in the reagent, and the removing step comprises contacting the drawn glass sheet with the reagent.

12. The method of claim 1, wherein the heating the glass preform comprises contacting a first glass composition in a viscous state with a second glass composition in a viscous state to form the glass preform.

13. The method of claim 1 wherein the glass sheet comprises a first glass layer, a second glass layer adjacent to the first glass layer, and a thickness of at most about 0.1 mm.

14. The method of claim 2, wherein the preheating of the glass preform to the first temperature in the preheating zone comprises heating the glass preform at a preheating rate, wherein the preheating is from about 5° C./min to about 200° C./min.

15. The method of claim 2, wherein the heating zone is shorter than the preheating zone longitudinally in the distal direction.

16. The method of claim 2, wherein the second temperature is at least about 100° C. greater than the first temperature.

* * * * *